Patented Oct. 13, 1953

2,655,525

UNITED STATES PATENT OFFICE 2,655,525

SULFATED ALCOHOL DETERGENTS FROM REACTION PRODUCT OF PRIMARY MONOHYDRIC ALCOHOLS WITH ETHYLENE

Fred W. Banes, Westfield, William P. FitzGerald, Elizabeth, and Joseph F. Nelson, Rahway, N. J., assignors to Standard Oil Development Company, a corporation of Delaware No Drawing. Application March 25, 1950, Serial No. 152,012

8 Claims. (Cl. 260—459)

This application is a continuation-in-part of Serial Number 130,784 filed December 2, 1949.

This invention is concerned with the production of detergents comprising alkyl sulfates in which the alkyl group contains 10 to 18 carbon atoms, preferably 12 to 16 carbon atoms, by reacting a primary aliphatic alcohol of lower molecular weight, e. g., methanol, ethanol, etc., with ethylene in the presence of a peroxide activator to produce a mixture comprising alkyl alcohols of increased molecular weight and sulfating the reaction mixture to convert the alkanols to sulfated products possessing detergent activity.

In the above-mentioned copending application there is described a process for reacting olefins, such as ethylene, with lower molecular weight primary or secondary aliphatic and cycloaliphatic alcohols at comparatively low pressure in the presence of a peroxide activator to produce a product comprising alcohols of increased molecular weight not above 500.

It has now been found that, by reacting ethylene with low molecular weight primary aliphatic alcohols at regulated reaction conditions in the presence of a peroxide activator, a mixture is obtained comprising alcohols having 10 to 18 carbon atoms per molecule which can be sulfated to produce excellent detergents of the alkyl sulfate type. The detergents are prepared from a narrow molecular weight alcohol product or from a mixture of alcohols whose molecular weight fall within the broad range of 10 to 18 carbon atoms. The most practical method of obtaining a product suitable for sulfation is to top the reaction product to a temperature of about 200° C. and recover a distillate boiling in the range of about 200° C. to 385° C. for detergent synthesis.

In order to produce alcohol products that are of molecular weight suitable for the synthesis of detergents the reaction between ethylene and the primary alcohol is carried out under controlled reaction conditions. These conditions are:

Pressure_____ 250–1500 p. s. i. (16–100 atmospheres).
Temperature ___ 70–225° C.
Activator_____ 0.005 to 0.25 g. peroxide/ml. alcohol.
Alcohol_____ Sufficient alcohol reactant to give a final reaction mixture of 10–50% concentration of alcohol product.

Peroxides or hydroperoxides are employed as activators for the reaction and the temperature of the reaction will depend to some extent upon the particular peroxide employed. Temperatures in the range of 70–225° C. have been found suitable. For example, one can operate in the range of 70–150° C. with activators such as t-butyl hydroperoxide and benzoyl peroxide, and at 125–225° C. with materials such as cumene hydroperoxide and di-t-butyl peroxide. Generally, a total of 0.005 to 0.3 part of activator is employed per part of olefin charged to the reactor. The amount of activator employed depends on several factors among which are molecular weight of product desired and method of activator addition to the reaction. When operating a batch process it is preferred that the activator be added in increments to the reactor since in this manner the reaction proceeds more uniformly and better reaction rates and more uniform products are obtained. Suitable peroxides are di-t-butyl peroxide, t-butyl hydroperoxide, benzoyl peroxide, cumene hydroperoxide, hydrogen peroxide, t-butyl perbenzoate, di-t-butyl perphthalate or peradipate, acetyl peroxide, urea peroxide, or mixtures of two or more of the same.

Products, or fractions thereof, prepared by the above mentioned process are sulfated by slowly adding an ether solution of the sulfating agent (chlorosulfonic acid) to an ether solution of the hydroxylated reactant. About a 10% molar excess of the acid is used and during the addition and for about 45 minutes thereafter the reaction mixture is maintained at 10–15° C. At the end of this time the reaction product is poured over cracked ice and the resulting solution is then neutralized with sodium hydroxide to a pH of 7. The neutralized solution is next extracted with petroleum ether to remove any unsulfated products, and this extract is washed with a 50–50 isopropanol-water solution which is added to the extracted aqueous solution. This solution is then diluted with 3 volumes of isopropyl alcohol and then desalted with anhydrous sodium carbonate. This desalting process is repeated twice in order to insure complete removal of inorganic salts. After determining the amount of sulfated product in the alcohol by gravimetric methods, sufficient sodium sulfate is added to the solution to give a blend of solids containing 60% sodium sulfate. This product is then recovered by evaporation of the alcohol.

The following examples are given as typical of the effectiveness of the present process.

*Example 1*

A solution containing 15 ml. of di-t-butyl peroxide in 900 ml. of ethyl alcohol was charged to a 3-liter autoclave. The system was flushed with ethylene vapors and the temperature raised to 145°–150° C. Ethylene was admitted to the reactor until a pressure of 1000 p. s. i. had been attained and was fed to the reactor at this pressure over a 5-hour period. At the end of the 1st, 2nd and 3rd hours, 15 ml. of activator dissolved in 50 ml. of ethanol were added to the reactor. At the end of 5 hours the reaction mixture was cooled to 25° C. and unreacted ethylene was vented from the system. The product was recovered by distilling off unreacted ethyl alcohol. This product weighed 530.9 grams and represented an 87 mole percent yield on the ethylene fed to the reactor. Distillation of the product gave 73 grams (15%) boiling in the range of 103° C. to 141° C. at 4.0 mm. Hg. This boiling range corresponds to that of $C_{12}$ to $C_{13}$ alcohol.

The fraction described above was treated with chlorosulfonic acid followed by washing and removal of unsulfated product. The isolated, purified sulfate represented a yield of 91% on the fraction being sulfated. A detergent was prepared by adding sodium sulfate to the solution of the sulfonated product so as to give a dry product containing 40% alkyl sulfate and 60% sodium sulfate. This product (detergent A) was evaluated as a detergent (see Table I).

*Example 2*

A product was prepared using the conditions cited in Example 1 except in that a total of 1800 ml. of ethyl alcohol was added to the reactor. The product was fractionated to give the following cuts:

| Cut No. | Boiling range | Percent of total product | Alcohol with corresponding boiling range |
|---|---|---|---|
| 1 | 68° C at 2.25 mm. to 93° C. at 1.9 mm | 13.0 | $C_{10}$ |
| 2 | 95° C. at 1.9 mm. to 122° C. at 1.7 mm | 12.75 | $C_{12}$ |
| 3 | 123° C. at 1.7 mm. to 145° C. at 1.5 mm | 8.95 | $C_{14}$ |
| 4 | 147° C. at 1.5 mm. to 175.5° C. at 1.2 mm | 11.0 | $C_{16}$ |
| 5 | 180° C. at 1.2 mm. to 201° C. at 1.1 mm | 7.85 | $C_{18}$ |

The above cuts cover a boiling range of 200° C. to 385° C. at atmospheric pressure.

A sample of cut 3 was sulfated with chlorosulfonic acid and purified to give a 85% yield of product. Sodium sulfate was added to an alcohol-water solution of the alkyl sulfate in such a way as to give a dry product containing 60 parts sodium sulfate and 40 parts alkyl sulfate (detergent B).

Equal parts (by weight) of cuts 1 to 5 inclusive were blended and sulfated with chlorosulfonic acid to give a 75% yield of product. A detergent (detergent C) was prepared from this product in the same manner as described in the preceding paragraph.

*Example 3*

Ethylene was reacted in the same equipment and under the same conditions as described in Example 1 except that methanol rather than ethanol was used as the reactant. A fraction of the product boiling in the range of 122° C. at 5 mm. to 152.5° C. at 4.5 mm. (about 250–290° C. at 760 mm. and the approximate boiling range of $C_{13}$-alcohols) was again sulfated with chlorosulfonic acid. The resulting sulfate was purified and diluted with sodium sulfate as described in previous examples. This detergent mixture is referred to as detergent D.

*Example 4*

The four detergents described above are evaluated for detergent activity. The detergents were compared with a commercially available product employed as a control and with the following laboratory products: $C_{13}$ Oxo alcohol sulfate derived from the oxonation of $C_{12}$ polypropylene followed by sulfation, 2-butyl-1-octanol sulfate, and a $C_{16}$ Oxo alcohol sulfate derived from the oxonation of a $C_{15}$ polypropylene followed by sulfation. The commercial product employed as a control comprises as the active ingredient the neutral sulfates of Lorol alcohol which according to the best information has the average molecular weight of a $C_{12}$ aliphatic alcohol. Comparative data on these products are presented in Table I. The tests employed involved measurements of soil removal, suds formation and suds stability in distilled water, in water of 240 p. p. m. hardness and in water of 720 p. p. m. hardness.

It is readily apparent from the inspection of these data that the detergent properties of the experimental production, detergents A, B, C and D are comparable to those of the commercial product in some tests but are definitely superior to the commercial product in many other tests, that is, particularly in the lower concentrations and in hard water.

Although the data presented in the above examples deal with products prepared from ethyl and methyl alcohols, similar products are also prepared from the higher primary alcohols such as propyl and butyl alcohols. However, ethyl and methyl alcohols are preferred due to their higher reaction rates with ethylene.

*Table I*

LAUNDER-OMETER EVALUATION OF DETERGENTS

[All materials tested contained 40% active ingredients.]

| | Soil removal [1] | | | | | | Suds formation [2] | | | | | | Suds stability [3] | | | | | |
|---|---|---|---|---|---|---|---|---|---|---|---|---|---|---|---|---|---|---|
| Concentration (percent) | 0.1 | 0.15 | 0.2 | 0.3 | 0.4 | 0.5 | 0.1 | 0.15 | 0.2 | 0.3 | 0.4 | 0.5 | 0.1 | 0.15 | 0.2 | 0.3 | 0.4 | 0.5 |
| Distilled water: | | | | | | | | | | | | | | | | | | |
| Lorol sulfate (control) | 20 | 30 | 50 | 80 | 100 | 100 | F | F | F | F | F | F | F | F | F | F | F | F |
| $C_{13}$ oxo alcohol sulfate [4] | 20 | 30 | 50 | | 40 | 90 | 0 | 0 | 0 | 10 | 200 | F | 0 | 0 | 0 | 0 | 50 | 200 |
| Detergent A | 20 | 60 | 80 | 90 | 90 | 90 | 10 | 20 | 100 | F | F | F | 5 | 10 | 50 | F | F | F |
| Detergent B | 50 | 100 | 100 | 110 | 110 | 130 | 10 | 100 | F | F | F | F | 5 | 80 | 200 | F | F | F |
| Detergent C | 50 | 60 | | 70 | 70 | 80 | 20 | 30 | 30 | 140 | F | F | 20 | 30 | 30 | 140 | 200 | F |
| Detergent D | 30 | 35 | 65 | 80 | 80 | 95 | 5 | 20 | 140 | F | F | F | 0 | 10 | 100 | F | F | F |
| 2-butyl-1-octanol sulfate | 0 | 0 | 0 | 0 | 0 | 0 | 0 | 0 | 0 | 0 | 0 | 5 | 0 | 0 | 0 | 0 | 0 | 0 |
| $C_{16}$ oxo alcohol sulfate [5] | 10 | 20 | 30 | 50 | 50 | 60 | 0 | 10 | 140 | F | F | F | 0 | 5 | 80 | 200 | F | F |
| 240 p. p. m. hard water: | | | | | | | | | | | | | | | | | | |
| Lorol sulfate (control) | 50 | 70 | 80 | 100 | 100 | 100 | F | F | F | 20 | F | F | F | F | F | 5 | 140 | 200 |
| $C_{13}$ oxo alcohol sulfate [4] | 10 | 10 | 10 | 20 | 80 | 110 | 0 | 0 | F | F | F | F | 0 | 0 | 5 | 140 | 200 | F |
| Detergent A | 30 | 60 | 100 | 120 | 120 | 110 | 20 | 100 | F | F | F | F | 10 | 100 | 240 | F | F | F |
| Detergent B | 90 | 90 | 100 | 120 | 120 | 120 | 10 | 100 | F | F | F | F | 10 | 100 | F | F | F | F |
| Detergent C | 50 | 50 | 70 | 80 | 100 | 110 | 20 | 100 | F | F | F | F | 20 | 100 | F | F | F | F |
| Detergent D | 50 | 85 | 90 | 100 | 80 | 75 | 140 | F | F | F | F | F | 140 | F | F | F | F | F |
| 2-butyl-1-octanol sulfate | 0 | 0 | 0 | 0 | 0 | 0 | 0 | 0 | 0 | 0 | 0 | 5 | 0 | 0 | 0 | 0 | 0 | 0 |
| $C_{16}$ oxo alcohol sulfate [5] | 0 | 0 | 0 | 10 | 0 | 0 | 40 | F | F | F | F | F | 10 | 40 | 60 | 80 | 140 | 200 |

Table I—Continued
LAUNDER-OMETER EVALUATION OF DTERGENTS
[All materials tested contained 40% active ingredients.]

| Concentration (percent) | Soil removal [1] | | | | | | Suds formation [2] | | | | | | Suds stability [3] | | | | | |
|---|---|---|---|---|---|---|---|---|---|---|---|---|---|---|---|---|---|---|
| | 0.1 | 0.15 | 0.2 | 0.3 | 0.4 | 0.5 | 0.1 | 0.15 | 0.2 | 0.3 | 0.4 | 0.5 | 0.1 | 0.15 | 0.2 | 0.3 | 0.4 | 0.5 |
| 720 p. p. m hard water: | | | | | | | | | | | | | | | | | | |
| Lorol sulfate (control) | 50 | 70 | 80 | 90 | 100 | 110 | F | F | F | F | F | F | F | F | 60 | 220 | F | F |
| $C_{13}$ oxo alcohol sulfate [4] | 0 | 0 | 0 | 80 | 90 | 100 | 0 | 10 | F | F | F | F | 5 | 20 | 80 | F | F | F |
| Detergent A | 50 | 80 | 90 | 95 | 100 | 110 | 10 | 30 | 100 | F | F | F | 0 | 10 | 50 | F | F | F |
| Detergent B | 70 | 100 | 110 | 110 | 120 | 110 | 10 | 100 | F | F | F | F | 10 | 20 | 40 | F | F | F |
| Detergent C | 20 | 60 | 50 | 70 | 90 | 90 | 10 | 20 | 40 | F | F | F | 30 | 200 | F | F | F | F |
| Detergent D | 50 | 70 | 70 | 85 | 100 | 100 | 30 | F | F | F | F | F | 0 | 0 | 0 | 0 | 0 | 0 |
| 2-butyl-1-octanol sulfate | 0 | 0 | 0 | 0 | 0 | 0 | 0 | 0 | 0 | 0 | 0 | 50 | 0 | 0 | 0 | 0 | 0 | 0 |
| $C_{16}$ oxo alcohol sulfate [5] | 0 | 0 | 0 | 0 | 0 | 0 | 0 | 20 | 100 | F | F | F | 0 | 5 | 10 | 20 | 100 | 120 |

[1] Soil removal relative to Lorol sulfate (control) at 0.5% in 240 parts per million hard water as 100 (P. & G. cloth).
[2] F designates that the total free space of container (280 cc.) is filled with suds, other figures represent actual volume of suds in ccs.
[3] Volume of suds (F=250 cc.) after 5 minutes rest following agitation of detergent solution.
[4] From oxonation of $C_{12}$-polypropylene.
[5] From oxonation of $C_{15}$-polypropylene.

Additional data were obtained on detergents prepared from polyethylene-ethanol and polyethylene-methanol products. In all cases 60/40 blends of sodium sulfate and sulfated products were used in the Launder-Ometer tests. All tests were run with U. S. testing cotton soil cloth in distilled, 120 p. p. m. hard water and 360 p. p. m. hard water. The control for these products was the detergent prepared from the neutral sulfates of Lorol B alcohol (duPont commercial product). The Lorol B alcohol was sulfated with $ClSO_3H$ according to the regular procedure and an 85% yield of product was recovered. This alcohol (Lorol B) is a blend of $C_{10}$ to $C_{18}$ alcohols having an average composition of a $C_{13}$ alcohol. According to analysis 90% of the alcohol mixture boils in the range of 270° to 347° C.

Example 5

The Lorol B alcohol detergent was compared to detergents which were obtained by sulfating a polyethylene-ethanol product fraction boiling in the range of 240° to 300° C. (137° C. at 16 mm. to 154° C. at 3.2 mm.) This fraction has an average of 13 carbon atoms per mole.

This particular fraction was obtained by distillation of a number of products made under widely varying operating conditions in a 3-liter autoclave. In all cases 1800 ml. of either 95% or absolute ethanol was charged to the reactor. A total of 60 ml. of di-t-butyl peroxide was also charged to the reactor, either initially or as equal volume increments during the course of a particular run. Runs were made at pressures of 250 to 1500 and at temperatures of 125 to 165° C. and at reaction times of 1 to 5 hours.

The fraction boiling in the range of 240° to 300° C. was shown by infra-red adsorption to be composed of predominantly secondary alcohols. Portions of this fraction were sulfated with different sulfating agents and detergents E, F and G were prepared from the sulfated products.

One portion was sulfated with chlorosulfonic acid in the same manner as has already been described. A yield of 85% of theoretical was recovered and detergent E was made up as a blend of 40% sulfated product and 60% sodium sulfate.

The second portion of the polyethylene-ethanol product was sulfated with oleum (20–30% $SO_2$ in concentrated $H_2SO_4$) using the same synthesis technique and conditions previously described. A yield of 83% was realized and the blend of sodium sulfate and this sulfated product is designated as detergent F.

A third portion of the fraction was sulfated with concentrated $H_2SO_4$ at 20° to 25° C. but otherwise under the same conditions as described earlier. The yield of product represented 50% of the theoretical yield. The detergent from this sulfate has been designated as detergent G.

Evaluation data relating to detergents E, F, and G and the Lorol B detergent are summarized in Table II. It will be noted that the $ClSO_3H$ and oleum sulfated products give detergents which are consistenly better than the Lorol B detergent when used in low concentrations and/or in hard water. On the other hand the concentrated $H_2SO_4$ product gives detergents which are less effective and are more nearly comparable with that obtained from the Lorol B sulfate. The sudsing properties (formation and stability) of the polyethylene products are equal to or superior to the corresponding properties of the Lorol B detergent.

Example 6

The polyethylene-methanol fraction used for the preparation of detergent H boiled at 137° C. at 2.6 mm. (285° C. at 760 mm.), this boiling point corresponding to that of a straight chain $C_{13}$-alcohol. The fraction was distilled from a blend of products that were prepared in a 9-liter continuous reaction unit. Conditions employed in these runs varied but fell in the following ranges:

| | |
|---|---|
| Reaction pressure | 500 to 900 p. s. i. g. |
| Reaction temperature | 155 to 185° C. |
| Alcohol feed rate | 4 lbs./hr. |
| DTBP[1] conc. in alcohol | 1 to 3 wt. percent. |
| Reactor hold up | 27 to 50 min. |
| Liquid feed temperature | 25 to 187° C. |
| Ethylene purity | 62 to 94 percent. |
| Volume percent product in reactor effluent (B. Pa.>85° C.) | 2 to 12 percent. |

[1] DTBP—Di-t-butyl peroxide.

The fraction boiling at 285° C. was sulfated with oleum in a manner previously described to give a 70% yield of sulfated product. A blend of 40 parts of this product and 60 parts of $Na_2SO_4$ has been designated as detergent H. It will be observed that this detergent is superior to the Lorol B detergent in hard water. This is rather surprising since it is well known that the neutral sulfates of pure alcohols of a single given molecular weight are inferior to products representing a blend of molecular weights as is the case with the neutral sulfates of Lorol B alcohols.

Comparative data on the detergents prepared in Examples 5 and 6 with Lorol B sulfate are given in the following Table II,

Table II
LAUNDER-OMETER EVALUATION OF DETERGENTS
[All materials tested contained 40% active ingredients]

| Concentrations (percent) | Soil removal [1] | | | | | Suds formation [2] | | | | | Suds stability [3] | | | | |
|---|---|---|---|---|---|---|---|---|---|---|---|---|---|---|---|
| | 0.1 | 0.15 | 0.2 | 0.35 | 0.5 | 0.1 | 0.15 | 0.2 | 0.35 | 0.5 | 0.1 | 0.15 | 0.2 | 0.35 | 0.5 |
| Distilled water: | | | | | | | | | | | | | | | |
| Lorol B alcohol sulfates | 0 | 10 | 25 | 71 | 88 | 0 | 20 | F | F | F | 0 | 0 | 20 | F | F |
| Detergent E | 36 | 51 | 58 | 63 | 69 | F | F | F | F | F | 100 | F | F | F | F |
| Detergent F | 0 | 23 | 43 | 51 | 61 | 100 | F | F | F | F | 30 | 250 | F | F | F |
| Detergent G | 0 | 10 | 15 | 43 | 43 | 40 | F | F | F | F | 0 | 200 | F | F | F |
| Detergent H | 0 | 10 | 10 | 41 | 55 | 30 | 150 | 150 | F | F | 0 | 50 | 50 | F | F |
| 120 p. p. m. hard water: | | | | | | | | | | | | | | | |
| Lorol B alcohol sulfates | 0 | 49 | 49 | 96 | 100 | F | F | F | F | F | 75 | 75 | F | F | F |
| Detergent E | 91 | 87 | 91 | 72 | 68 | F | F | F | F | F | F | F | F | F | F |
| Detergent F | 63 | 67 | 70 | 70 |  | F | F | F | F | F | 200 | F | F | F | F |
| Detergent G | 0 | 24 | 43 | 48 | 53 | 10 | F | F | F | F | 5 | F | F | F | F |
| Detergent H | 17 | 37 | 58 | 46 | 46 | F | F | F | F | F | 150 | 250 | F | F | F |
| 360 p. p. m. hard water: | | | | | | | | | | | | | | | |
| Lorol B alcohol sulfates | 25 | 53 | 62 | 62 | 75 | F | F | F | F | F | 10 | F | F | F | F |
| Detergent E | 98 | 120 | 116 | 112 | 108 | F | F | F | F | F | F | F | F | F | F |
| Detergent F | 74 | 124 | 105 | 105 | 94 | 30 | 250 | F | F | F | 10 | 200 | F | F | F |
| Detergent G | 43 | 43 | 48 | 58 | 63 | 10 | 50 | F | F | F | 5 | 20 | 140 | F | F |
| Detergent H | 63 | 67 | 83 | 88 | 75 | 150 | F | F | F | F | 10 | 200 | F | F | F |

[1] U. S. testing cotton soil cloth.
[2] Vol. of suds in test vessel after 5 min. agitation in Launder-Ometer; max. suds volume 280 cc.
[3] Vol. of suds after 5 min. agitation and standing at rest for 5 min.; F represents 280 cc.

What is claimed is:

1. A process for producing an alkyl sulfate detergent which comprises reacting monohydric alcohol containing from 10 to 18 carbon atoms per molecule with a sulfating agent and recovering the alkyl sulfate detergent product from the sulfation reaction mixture, said monohydric alcohol having been prepared by a process comprising reacting a primary monohydric alcohol of 1 to 4 carbon atoms with ethylene in the presence of a peroxide activator at a temperature in the range of 70°–225° C., a pressure in the range of 250–1500 p. s. i. g. and for a period of from 1 to 5 hours.

2. The process of claim 1 in which the primary monohydric alcohol of 1 to 4 carbon atoms is ethanol.

3. The process according to claim 2 in which the ethanol-ethylene reaction is carried out at a temperature of 145°–150° C. and a pressure of approximately 1000 pounds, and in which the sulfating agent is chlorosulfonic acid.

4. The process as in claim 1 in which the primary monohydric alcohol of 1 to 4 carbon atoms is methanol.

5. The process according to claim 4 in which the methanol-ethylene reaction is carried out at a temperature of 155°–185° C. and a pressure of approximately 500 to 1000 pounds, and in which the sulfating agent is oleum.

6. The process according to claim 1 in which the sulfating agent is chlorosulfonic acid.

7. The process according to claim 1 in which the sulfating agent is oleum.

8. The process according to claim 1 in which the peroxide activator is ditertiary butyl peroxide.

FRED W. BANES.
WILLIAM P. FITZGERALD.
JOSEPH F. NELSON.

References Cited in the file of this patent

UNITED STATES PATENTS

| Number | Name | Date |
|---|---|---|
| 1,921,381 | Beller et al. | Aug. 8, 1933 |
| 2,204,323 | Smith | June 11, 1940 |
| 2,402,137 | Hanford et al. | June 18, 1946 |
| 2,517,732 | Stiteler | Aug. 8, 1950 |

OTHER REFERENCES

Ser. No. 83,244, Reibnitz (A. P. C.), published June 22, 1943.